(12) United States Patent
Lumpkin

(10) Patent No.: US 6,230,849 B1
(45) Date of Patent: May 15, 2001

(54) STRUCTURE FOR ADJUSTABLY ATTACHING A DISC BRAKE CALIPER TO A BICYCLE FRAME

(75) Inventor: Wayne R. Lumpkin, Littleton, CO (US)

(73) Assignee: Avid, L.L.C., Englewood, CO (US)

( * ) Notice: Subject to any disclaimer, the term of this patent is extended or adjusted under 35 U.S.C. 154(b) by 0 days.

(21) Appl. No.: 09/383,121

(22) Filed: Aug. 25, 1999

Related U.S. Application Data

(60) Provisional application No. 60/142,559, filed on Jul. 7, 1999.

(51) Int. Cl.[7] .................................................. B62L 1/02
(52) U.S. Cl. .............................. 188/24.12; 188/26
(58) Field of Search ........................ 188/26, 72.4, 71.7, 188/24.12, 24.19, 196 M, 24.11, 24.22, 344, 218 XL

(56) References Cited

U.S. PATENT DOCUMENTS

| | | |
|---|---|---|
| 3,675,741 | 7/1972 | Frei et al. . |
| 3,949,838 | 4/1976 | Fuhrman . |
| 4,022,297 * | 5/1977 | Haraikawa ............................. 188/26 |
| 4,051,924 | 10/1977 | Yoshigai . |
| 4,215,768 * | 8/1980 | Seki .................................... 188/26 X |
| 4,297,870 | 11/1981 | Pearson et al. . |
| 4,360,082 * | 11/1982 | Haraikawa et al. ............. 188/344 X |
| 4,444,294 | 4/1984 | Yoshigai . |
| 4,611,692 | 9/1986 | Everett . |
| 5,413,193 | 5/1995 | Miller . |
| 5,564,531 | 10/1996 | Lumpkin . |
| 5,632,362 | 5/1997 | Leitner . |
| 5,743,284 | 4/1998 | Lumpkin . |
| 5,806,935 | 9/1998 | Shermeister . |
| 5,960,913 | 10/1999 | Kuo . |
| 5,979,609 * | 11/1999 | Tsai ........................................ 188/26 |
| 6,148,964 * | 11/2000 | Huang .................................... 188/26 |

FOREIGN PATENT DOCUMENTS 2 053 389    2/1981 (GB) .

OTHER PUBLICATIONS

Exploded view of Hayes Hydraulic Brake Caliper from BTI or Quality catalog (1999).

* cited by examiner

*Primary Examiner*—Robert J. Oberleitner
*Assistant Examiner*—Pamela J. Rodriguez
(74) *Attorney, Agent, or Firm*—Swanson & Bratschun, LLC

(57) ABSTRACT

An attachment structure for a caliper of a disc brake assembly consisting of a caliper and a rotor. The caliper is attached to a wheel supporting portion of a cycle frame which supports a wheel with the rotor fixedly attached to the wheel and the rotor lying in a fixed plane relative to the supporting portion of the frame. The supporting portion of the frame has a pair of attachment bores oriented to attach the caliper with the rotor received between a pair of brake pads advanced into and out of contact with the rotor by the caliper along a select axis. The attachment structure allows for infinite variation of the angle of incidence between the select axis and the plane of the rotor within a defined range. Attachment bolts secure the caliper to the frame with a select angle of incidence between the select axis and the plane of the rotor.

20 Claims, 6 Drawing Sheets

US 6,230,849 B1

STRUCTURE FOR ADJUSTABLY ATTACHING A DISC BRAKE CALIPER TO A BICYCLE FRAME

RELATED APPLICATIONS

This application claims priority from U.S. Provisional Patent Application Ser. No. 60/142,559, filed Jul. 7, 1999, entitled "Structure for Adjustably Attaching a Disc Brake Caliper to a Bicycle Frame."

BACKGROUND OF THE INVENTION

1. Technical Field

The present invention is directed toward bicycle brakes, and more particularly toward a structure for adjustably attaching a disc brake caliper to a bicycle frame.

2. Background Art

Disc brakes for bicycles are growing in popularity as consumers demand and bicycle manufacturers strive to provide ever advancing technology on bicycles. Disc brake systems generally consist of a rotor which is fixedly attached to the hub of a bicycle wheel and a caliper which is fixedly attached to a wheel supporting portion of the bicycle frame and which receives the rotor between a pair of bike pads which are advanced into and out of contact with the rotor along a select axis. The wheel supporting portion of the frame has some structure for attaching the caliper to the chain or seat stay in the rear or fork in the front of the frame. This structure typically consists of a boss or a pair of bosses which extend from the frame substantially parallel to the plane of the rotor and which have internally threaded bores in their distal ends which are intended to lie in a plane normal to the plane of the rotor. The caliper, in turn, has a mounting foot which extends from the caliper body and includes a pair of holes corresponding to the bores in the ends of the attachment bosses. The caliper is then bolted to the frame by bolts axially received the holes in the mounting foot. When properly aligned, the rotor will be received between the brake pads of the caliper so that the brake pads of the caliper are advanced into and out of contact with the rotor along an axis that is normal to the plane of the rotor.

Assuming that the attachment bosses extend parallel to the plane of the rotor and that the ends of the attachment bosses lie in a plane perpendicular to the plane of the rotor, prior art calipers would be properly aligned with the brake pads being advanced along an axis normal to the rotor. In practice, however, the normal range of manufacturing tolerances in the bicycle and caliper makes it unlikely that the caliper will be properly aligned with respect to the rotor. When the caliper is not properly aligned, the brake pads will not strike the rotor flush which can degrade brake performance. It can even lead to the brake pads rubbing against the rotor and deteriorating bicycle performance.

One structure known in the prior art for addressing this improper alignment is providing elongate slots on the mounting foot of the caliper corresponding to the bores in the mounting bosses which extend substantially parallel to the select axis of advancement of the pads. These slots allow translational movement of the caliper toward and away from the rotor to precisely position the rotor intermediate the pads of the caliper. In addition, these slots enable the caliper to be canted about an axis parallel to an axis of the mounting boss bores to compensate for some misalignment between the rotor and the caliper. However, because these slots only allow for translational movement and some range of canting, they do not enable proper alignment with the rotor if the tolerances cause misalignment outside of these limited directions of travel.

The present invention is directed toward overcoming one or more of the problems discussed above.

BRIEF SUMMARY OF THE INVENTION

The present invention is an attachment structure for a caliper of a disc brake assembly consisting of a caliper and a rotor. The caliper is attached to a wheel supporting portion of a cycle frame which supports a wheel with the rotor fixedly attached to the wheel and the rotor lying in a fixed plane relative to the supporting portion of the frame. The supporting portion of the frame has a pair of attachment bores oriented to attach the caliper with the rotor received between a pair of brake pads advanced into and out of contact with the rotor by the caliper along a select axis. The attachment structure allows for infinite variation of the angle of incidence between the select axis and the plane of the rotor within a defined range. Attachment bolts secure the caliper to the frame with a select angle of incidence between the select axis and the plane of the rotor.

Another aspect of the present invention is a disc brake assembly attachable to a wheel supporting portion of a frame of a cycle. The disc brake assembly includes a rotor fixedly attached to a wheel mounted to the wheel supporting portion of the frame, with the rotor residing in a plane of fixed orientation relative to the wheel supporting portion of the frame. A caliper receives the rotor between a pair of brake pads with the caliper advancing the brake pads into and out of contact with the rotor along a select axis. An attachment structure attaches the caliper to the wheel supporting portion of the frame with the angle of incidence between the select axis and the plane of rotor being infinitely variable within a defined range. In this manner, the caliper can be aligned with the select axis normal to the rotor. At least one bolt is operatively associated with the attaching structure to secure the caliper to the frame with the select axis aligned normal to the rotor. The attaching structure preferably includes slots on the caliper substantially parallel to the select axis for enabling translational movement of the caliper toward and away from the rotor.

The attaching structure may include a pair of spaced bores on the wheel supporting portion of the frame defining a line substantially parallel to the plane of the rotor, the bores having openings which lie in a plane substantially normal to the plane of the rotor. A convex surface is associated with the mouth of each bore. A mating concave surface is associated with a bottom of a mounting foot of the caliper. Aligned holes extend through each of the concave and convex surfaces and correspond to the bores in the wheel supporting portion of the frame. A pair of slots in the mounting foot of the caliper also corresponds to the bores. These slots are substantially parallel to the select axis. A bolt having a head and a shaft is axially received in each slot, aligned hole and corresponding bore with the head protruding therefrom. The bolt is threadably engaged with the bores to maintain the caliper with the select axis aligned normal to the rotor. The attaching structure preferably further includes a pair of washers having mating concave and convex surfaces and opposite flat surfaces receiving the bolt with one of the flat surfaces abutting a top of the mounting foot of the caliper and the other of the flat surfaces abutting the head of the bolt.

In one embodiment, the mating concave and convex surfaces associated with the mouth of each bore and the underside of the mounting foot of the caliper comprise a pair of washers having mating concave and convex surfaces and opposite flat surfaces, with the washer pairs residing with one of the flat surfaces abutting the bottom of the caliper mounting foot and the other of the flat surfaces abutting the wheel supporting portion of the frame.

In another embodiment, the mating concave and convex surfaces associated with the mouth of each bore and the bottom of the mounting foot consists of a pair of plates having the mating concave and convex surfaces and opposite flat surfaces, the pair of plates further including the aligned holes, the plates residing with one flat surface abutting the bottom of the mounting foot and the other flat surface abutting the wheel supporting portion of the frame. Preferably, the aligned holes are elongate and correspond to the slots in the caliper mounting foot.

Yet another aspect of the present invention is a structure for attaching a caliper of a disc brake system to a cycle frame with a pair of brake pads advanced by the caliper in operative engagement with a rotor of the disc brake system, the frame having a pair of threaded caliper mounting bores and the caliper having a mounting foot. The attachment structure consists of mating concave and convex surfaces between the frame and a bottom of the caliper mounting foot to pivot the caliper about a pivoting axis. A pair of holes corresponding to the caliper mounting bores extend through the concave and convex mounting surfaces. A pair of spaced slots on the caliper mounting foot extend transverse the pivoting axis and are aligned with the holes and the mounting bores. A pair of bolts are axially received in the aligned slots, holes and the threaded mounting bores with the bolts engaging the threaded mounting bores to maintain the pads of the caliper in a select orientation relative to the rotor. The mating concave and convex surfaces may be a pair of washers residing between the bottom of the caliper mounting foot and the frame corresponding to each of the caliper mounting bores. Alternatively, the mating concave and convex surfaces residing between the bottom of the caliper mounting foot and the frame may be formed on a pair of elongate plates. Alternatively, one of the concave and convex surfaces may be on the bottom of the caliper mounting foot and the other may be on an elongate plate residing between the bottom of the caliper mounting foot and the frame. In this embodiment, the pair of holes in the elongate plate are preferably elongate to correspond to the slots in the caliper mounting foot. Preferably, mating concave and convex surfaces are further provided between the head of the bolt and the top of the caliper mounting foot. The mating concave and convex surfaces are preferably on a pair of washers corresponding to each of the bolt heads residing between the bolt heads and the top of the caliper mounting foot.

The structure for adjustably attaching a disc brake caliper to a bicycle frame of the present invention allows for infinite variation of the angle of incidence between an axis of movement of caliper brake pads and the plane of a rotor within a defined range. Thus, the caliper can be adjusted so that the select axis in is the desired orientation of normal to the plane of the rotor notwithstanding manufacturing tolerances and manufacturing defects that would cause the axis of pad travel of prior art calipers not to be normal to the plane of the rotor. In addition, the attachment structure allows translation of the caliper toward and away from the rotor to compensate for variations in the spacing between the attachment studs and the disc brake rotor amongst the bicycles of various manufacturers. The structure for adjustably attaching the disc brake is virtually self-adjusting within its defined range. The caliper can be readily self-aligned simply by loosening the attachment bolts, actuating the brake pads into abutment with the rotor and then tightening the attachment bolts. Thus, the many advantages of having the select axis of movement of the brake pads normal to the rotor can be achieved with minimal effort on the part of the user. Moreover, the structure providing these many advantages is inexpensive to manufacture and can be made from off the shelf parts making it an inexpensive solution to an otherwise vexing problem.

DETAILED DESCRIPTION OF THE PREFERRED EMBODIMENT

Figure 1:
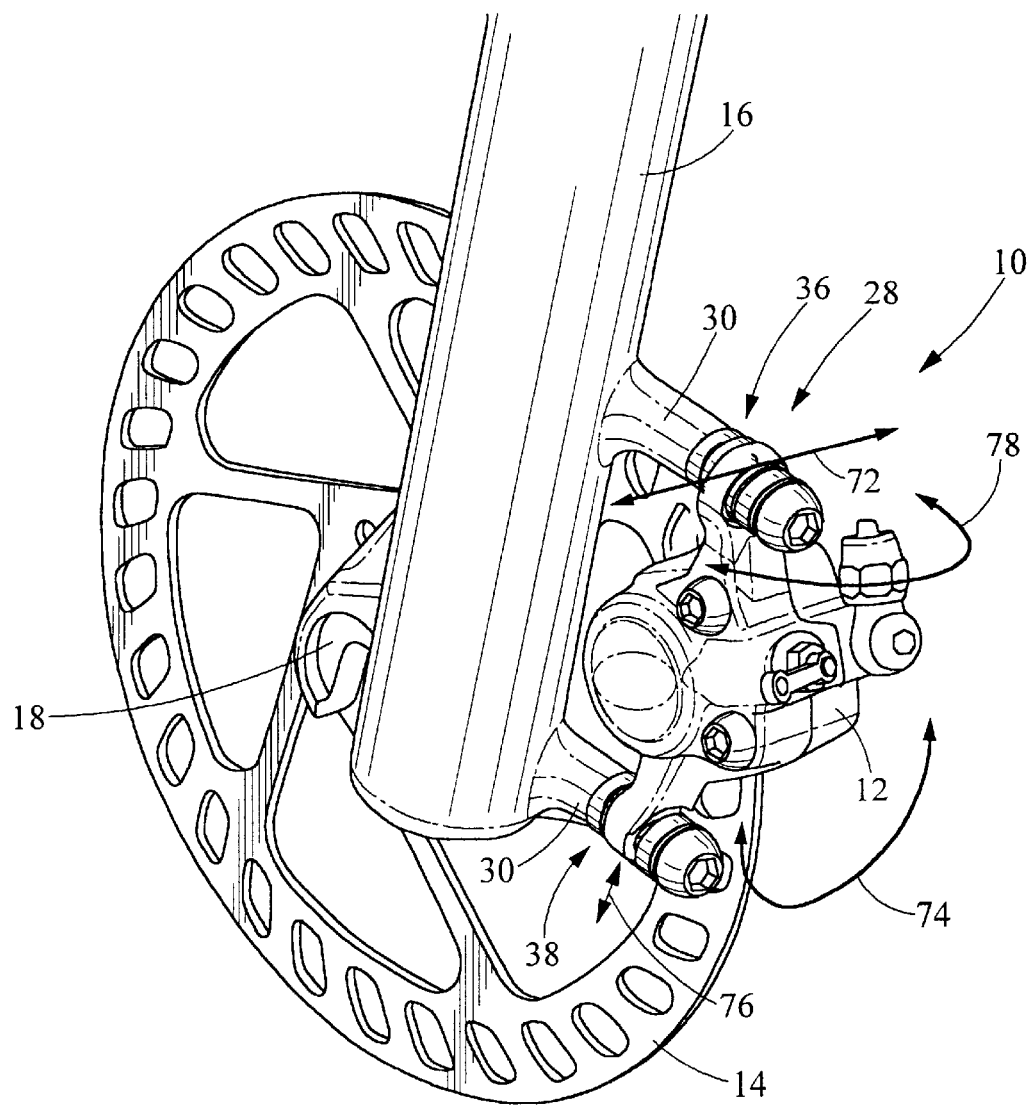
FIG. 1 is a perspective view of a caliper mounted to the front fork of a bicycle in operative association with a rotor using a structure for adjustably attaching a disc brake to a bicycle frame of the present invention.

A disc brake system 10 consisting of a caliper 12 and a rotor 14 is illustrated in FIG. 1 with the caliper attached to a front fork 16 of a bicycle frame. Although omitted for the sake of clarity, the rotor 14 is fixedly attached to a hub of a wheel for rotation with the wheel with the wheel hub being attached to the bracket 18 of the front fork. Thus, the front fork 16 acts as a wheel support portion of the bicycle frame. The rotor 14 is maintained in a fixed plane relative to the wheel and the front fork.

Figure 7:
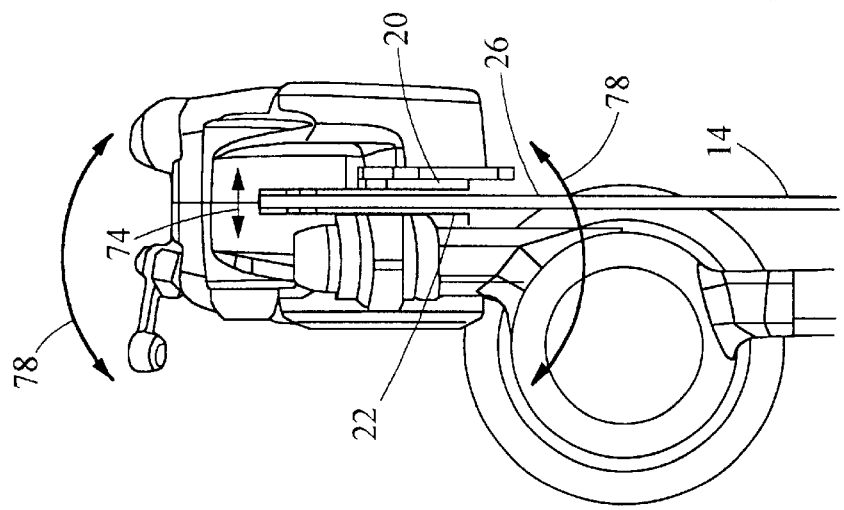
FIG. 7 is a bottom view of the caliper of FIG. 1 showing the hinged movement of the caliper relative to the rotor afforded by the present invention.

The rotor 14 is received between a pair of brake pads 20, 22 attached to the caliper 12 which are best viewed in FIG. 7. The brake pads are advanced into and out of contact with the rotor along a select axis 24 which is intended to be normal to the plane 26 of the rotor 14.

Figure 2:
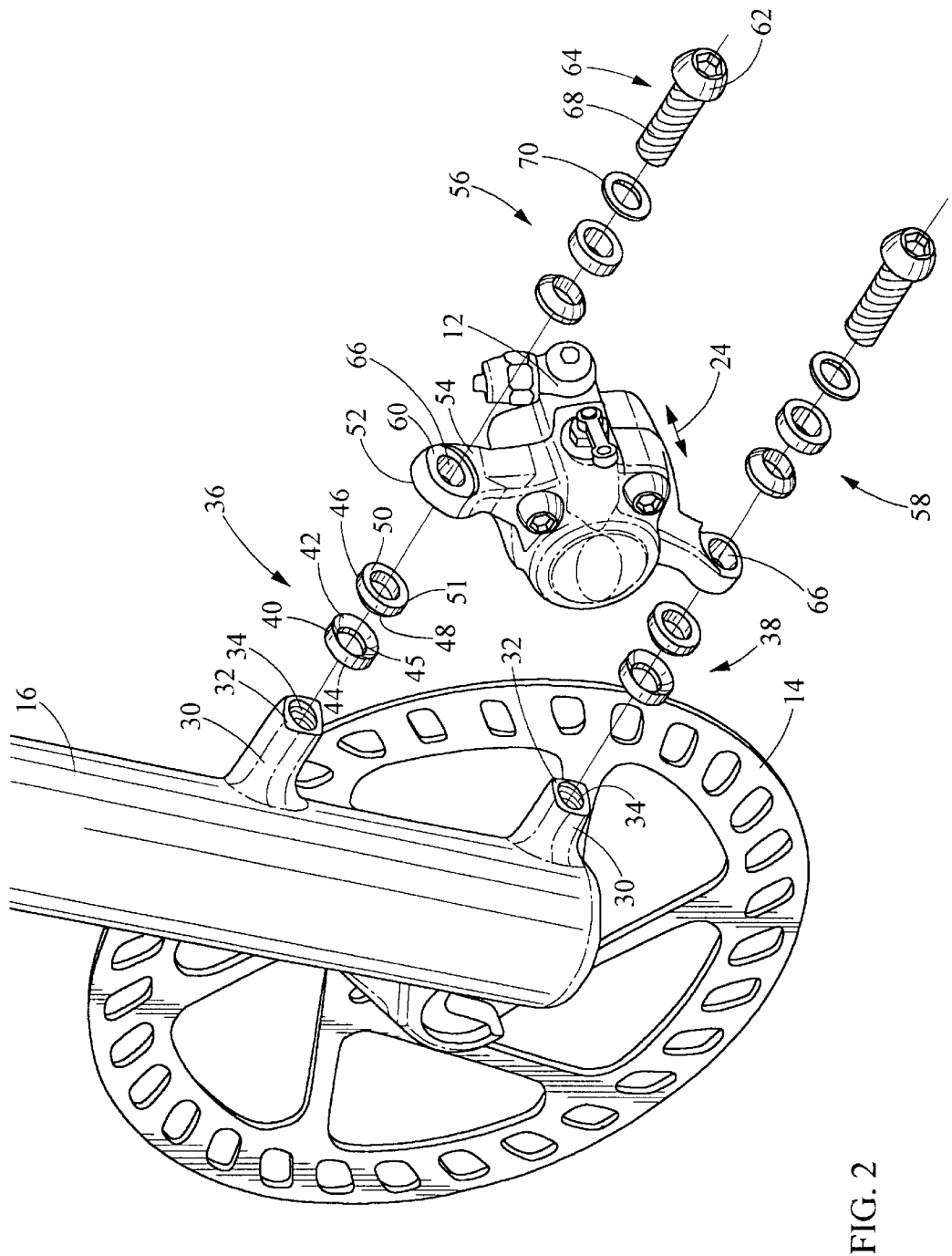
FIG. 2 is an exploded view of the structure for adjustably attaching a disc brake caliper to a front fork of a bicycle frame of FIG. 1.

A pair of attachment bosses 30 extend from the fork 16 preferably parallel to the plane of the rotor 14. Referring to FIG. 2, the distal ends 32 of the attachment bosses have an internally threaded bore 34 which is also preferably parallel to the plane of the rotor 14. The distal ends of the attachment bosses 30 preferably each lie in a common plane which is normal to the plane of the rotor 14. However, due to manufacturing tolerances and in some cases manufacturing defects, often one of the axes of the threaded bores 34, the distal ends 32 of the attachment bosses 30 or the plane of the rotor 14 are not precisely in the desired alignment. A structure for adjustably attaching the caliper to a bicycle frame 28 is intended to allow for necessary realignment.

The structure for adjustably attaching the caliper to a bicycle frame 28 consists of first and second pairs of washers 36, 38. A first washer 40 of the washer pair 36 has a concave semispherical surface 42 and a flat surface 44 with a hole 45 extending there between. The second washer 46 of the washer pair 36 has a convex semispherical surface 48 which mates with the concave surface 42. Opposite the convex surface 48 is a flat surface 50. A hole 51 extends between the surfaces. The second washer pair 38 is identical to the first washer pair 36. The first and second washer pairs 36, 38 reside between the distal ends 32 of the attachment bosses 30 and the bottom 52 of a mounting foot 54 of the caliper 12. Third and fourth identical washer pairs 56, 58 reside between a top surface 60 of the mounting foot 54 and the head 62 of bolt 64. The mounting foot 54 has a pair of elongate slots 66 which extend lengthwise parallel to the select axis 24. The shaft 68 of the bolt 64 is axially received through the holes in the third washer pair and the elongate slot 66 and the holes in the first washer pair 36 and the shaft 68 is threadably engaged with the bore 34 of the attachment boss 30. A conventional washer 70 may be further provided adjacent the head 62 of the attachment bolt 64.

Figure 6:
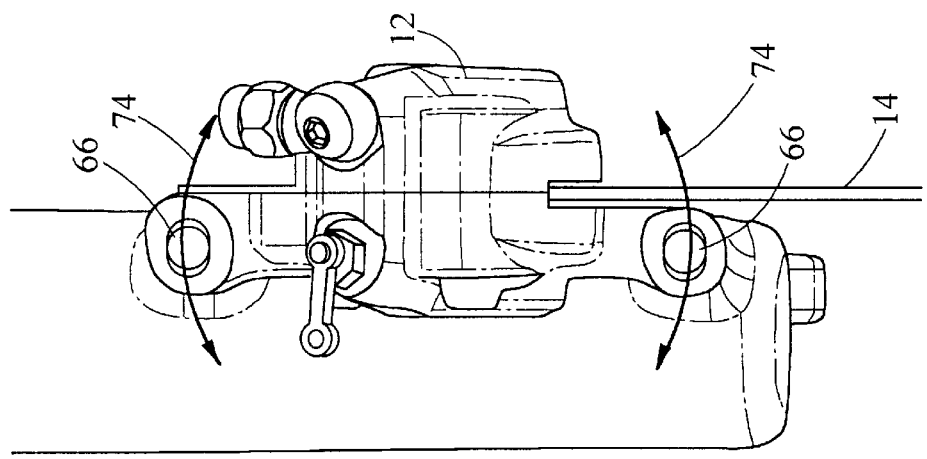
FIG. 6 is a rear view of the caliper of FIG. 1 showing the canting movement afforded by the caliper relative to a rotor of the present invention.
Figure 5:
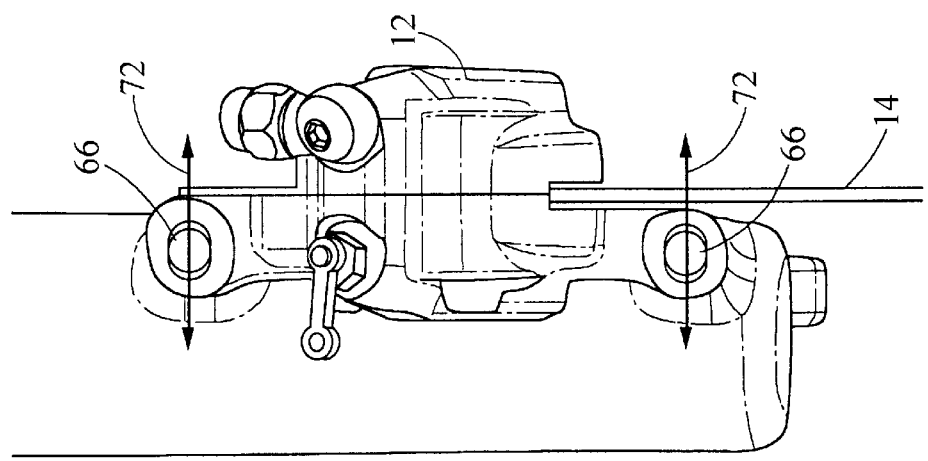
FIG. 5 is a rear view of the caliper of FIG. 1 showing the translational movement of the caliper relative to the rotor afforded by the present invention.

In use, with the caliper attached as described above, the caliper is moveable in several directions which enable the angle of incidence of the select axis 24 to vary infinitely within a select range so that the select axis 24 can be aligned normal to the plane of the rotor 14. Referring to FIG. 1, arrow 72 illustrates how the caliper can be moved by translation toward and away from the rotor 14. This movement is also illustrated by the arrows 72 in FIG. 5. This movement is possible by virtue of the elongate slots 66. The elongate slots 66 also enable canting of the caliper 12 relative to the rotor 14 as illustrated by arcuate arrow 74 in FIG. 1 and also in FIG. 6. Finally, the caliper can be pivoted about a virtual axis 76 such that the caliper is in essence hinged about the engaging concave and convex surfaces of the first and second washer pairs 36, 38. This movement is illustrated by the arrow 78 in FIGS. 1 and 7.

By virtue of the canting movement allowed by the elongate slots 66 and the hinged movement allowed by the engaging concave and convex surface of the first and second washer pairs 36,38, the select axis 24 can be moved relative to the plane of the rotor 14 to have an angle of incidence which is infinitely variable in three dimensions within a select range of movement. Thus, the caliper 12 can be aligned so that the select axis 24 is normal to the plane of the rotor 14. Furthermore, the elongate slot 66 enables translational movement of the caliper relative to the rotor 14 to allow the rotor 14 to be placed in a desired position between the brake pads 22.

Figure 3:
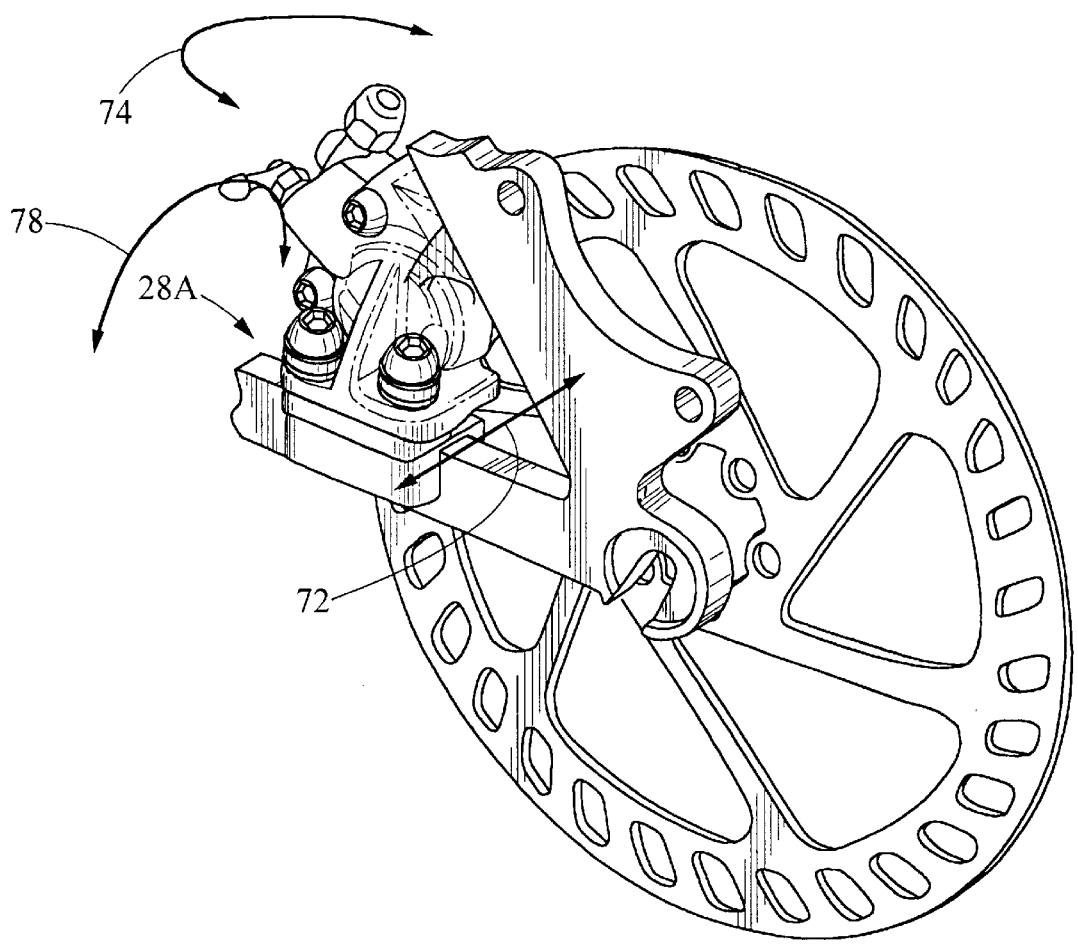
FIG. 3 is a perspective view of a caliper mounted to a chain stay of a bicycle frame in operative engagement with a rotor using a second embodiment of a structure for adjustably attaching a disc brake to a bicycle frame of the present invention.
Figure 4:
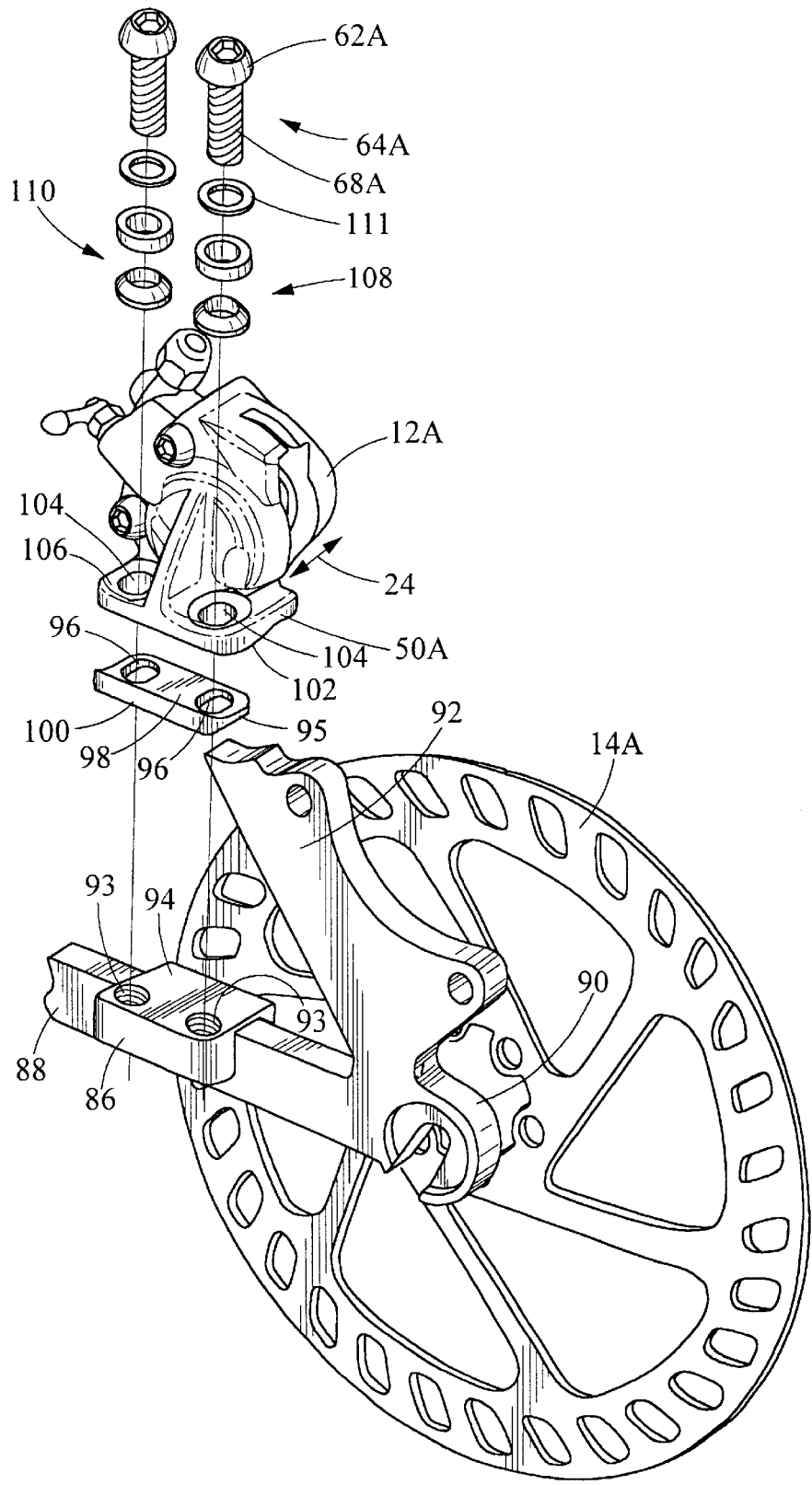
FIG. 4 is an exploded view the structure for adjustably attaching a disc brake caliper to bicycle frame of FIG. 3.

FIG. 3 illustrates a second embodiment of the structure for adjustably attaching the caliper to a bicycle frame 28A. As best seen in FIG. 4, this embodiment, a mounting bracket 86 is fixedly attached to a chain stay 88 which would be at the rear of the bicycle frame. A bracket 90 is at the intersection of the chain stay 88 and the seat stay 92 to which a wheel, which has been omitted for clarity, can be attached to the rear of the bicycle frame. The rotor 14A is fixedly attached to a hub of the wheel. As with rotor 14 of FIG. 1, rotor 14A is maintained in a fixed plane relative to the wheel and the chain stay 88. The mounting bracket 86 has a pair of internally threaded bores 93 the openings of which lie in a plane defined by the surface 94 which is intended to be substantially perpendicular to the plane of the rotor 14A.

The second embodiment of the attachment structure for adjustably attaching a caliper to a bicycle frame 28A consists of an elongate plate 95 having a pair of transverse elongate slots 96 extending between a concave surface 98 and a flat surface 100. The caliper 12A has a mounting foot 50A having an elongate convex bottom surface 102 which mates with the concave surface 98 of the elongate plate 95. A pair of elongate slots 104 corresponding with and aligning with the elongate slots 96 in the elongate plate 95 extend parallel to the select axis 24 between the top 106 and the convex bottom 102 of the foot 50A. First and second washer pairs 108, 110 which are identical to the washer pair 36 discussed above with regard to FIG. 2, reside between the head 62A of the attachment bolt 64A and the top 106 of the mounting foot 50A. The shafts 68A are axially received by an optional conventional washer 111 and the washer pairs 108,110, the elongate slots 104, in the mounting foot 50A and the elongate slots 96 in the elongate plate 94 and threadably engaged in the threaded bores 93 to maintain the caliper in a select position.

As with the first embodiment discussed with reference to FIGS. 1, 2, 5 , 6 and 7, the second embodiment in FIG. 3 has elongate slots 96, 104 allow translational movement in the direction of the arrow 72 and canting movement in the direction of the arcuate arrow 74. The mating concave and convex surfaces allow for hinged movement as illustrated by arrow 78. In this manner, the second embodiment 28A allows for the same movement and adjustable attachment as the first embodiment 28.

It should be noted that the first and second washer pairs 36, 38 could be substituted for the plate 94 and the convex surface 102 of the foot 50A. However, the second embodiment provides a greater surface area to resist slipping.

Figure 8:
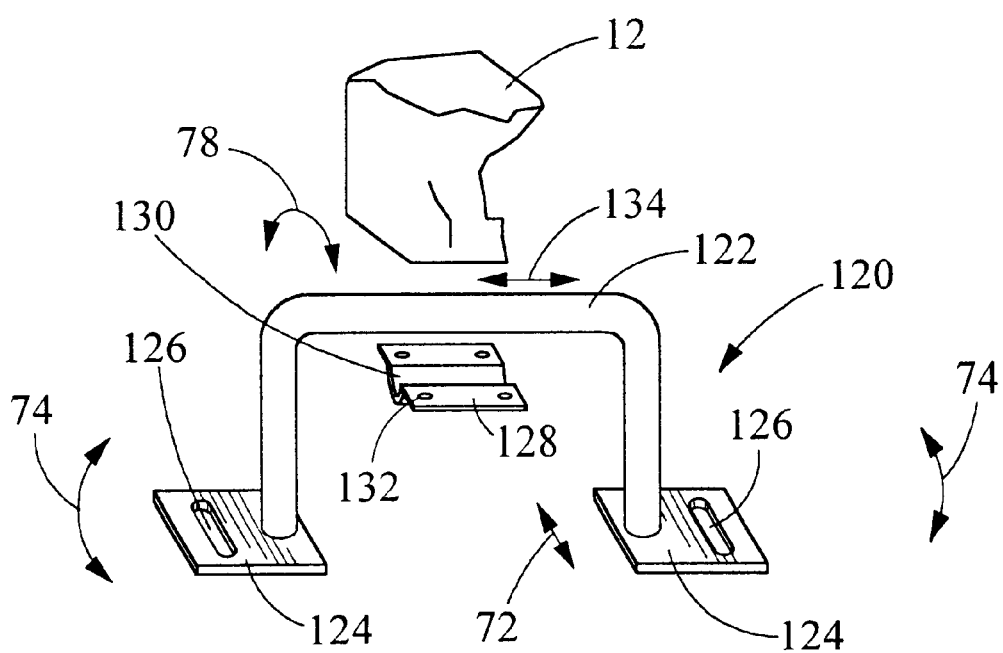
FIG. 8 is a perspective view of a third embodiment of an attachment structure of the present invention providing the translational movement of FIG. 5, the canting movement of FIG. 6, the hinged movement of FIG. 7 as well as axial movement along a rod.

FIG. 8 illustrates a third embodiment in the present invention that allows for a fourth direction of movement of the caliper 12. In this embodiment, a caliper attachment bracket 120 consists of a rod 122 attached to footing plates 124 at each end. The footing plates 124 include elongate slots 126. The footing plates 124 are attachable to the distal ends of the attachment bosses 30 discussed with reference to FIGS. 1 and 2. A plate 128 having a transverse chanel 130 therein for receiving the bar 122 has a number of holes 132 to allow for fixed attachment of the plate 128 to the bottom of the caliper 12 with a number of screws or bolts, not shown. Once attached, the caliper can be moved translationally as indicated by the arrow 72 canted relative to a rotor illustrated by the arcuate arrows 74 in a hinged manner as illustrated by the arcuate arrow 78 and axially of the bar 122 as illustrated by the arrow 134. Thus, the third embodiment illustrated in FIG. 8 allows for an additional direction of travel over the first and second embodiments 28, 28A.

The caliper attachment structure of the present invention allows for a great range of movement of the caliper so that the caliper pads can travel along a select axis normal to the plane of the operatively associated rotor regardless of manufacturing tolerances and minor defects. In this manner, braking efficiency can be maximized by assuring that the brake pads are brought into full-flush contact with the rotor. In addition, undesired rubbing between the caliper pads and rotor by misalignment can be minimized. The caliper attachment structure also provides for virtually instantaneous self-alignment. The user need only loosen the attachment bolts, actuate the caliper to advance the brake pads into engagement with the rotor and then tighten the attachment bolts. The attachment structure therefore compensates for manufacturing tolerances and manufacturing defects which can result in misalignment between caliper pads and a rotor of a disc brake system. As can be readily appreciated, these many advantages are provided by a structure which is capable of being fabricated from off the shelf parts and is easily assembled and, perhaps most importantly, is extremely easy for a user to employ.

What is claimed is:

1. A disc brake assembly attachable to a wheel supporting portion of a frame of a cycle, the disc brake assembly comprising:

a rotor fixedly attached to a wheel mounted to the wheel supporting portion of the frame, the rotor residing in a plane of fixed orientation relative to the wheel supporting portion of the frame;

a caliper receiving the rotor between a pair of brake pads, the caliper advancing at least one of the brake pads to bring the brake pads into and out of contact with the rotor along a select axis;

means for attaching the caliper to the wheel supporting portion of the frame with the angle of incidence between the select axis and the plane of the rotor being infinitely variable within a defined range, whereby the caliper can be aligned with the select axis normal to the rotor; and at least two bolts operatively associated with the attaching means to secure the caliper to the frame with the select axis aligned normal to the rotor.

2. The disc brake assembly of claim 1 wherein the means for attaching comprises slots on the caliper substantially parallel to the select axis for enabling translational movement of the caliper toward and away from the rotor, the at least two bolts being axially received in the slots.

3. The disc brake assembly of claim 1 wherein the means for attaching comprises:

a pair of spaced bores on the supporting portion of the frame defining a line substantially parallel to the plane of the rotor, the bores having openings which lie in a plane substantially normal to the plane of the rotor;

one of a concave and a convex surface associated with the mouth of each bore;

a mating one of a concave and a convex surface associated with a bottom of a foot of the caliper;

aligned holes extending through each of the concave and convex surfaces corresponding to the bores;

a pair of slots in the mounting foot of the caliper corresponding to the bores, the slots being substantially parallel to the select axis; and each bolt having a head and a shaft with the shaft received in a slot, aligned hole and corresponding bore with the head protruding therefrom and the bolt being threadably engaged with each bore to maintain the caliper with the select axis aligned normal to the rotor.

4. The disc brake assembly of claim 3 further comprising a pair of washers having mating concave and convex surfaces and opposite flat surfaces receiving each bolt with one of the flat surfaces abutting the top of the mounting foot of the caliper and the other of the flat surfaces abutting the head of each bolt.

5. The disc brake assembly of claim 3 wherein mating concave and convex surfaces associated with the mouth of each bore and the underside of the mounting foot of the caliper comprise a pair of washers having the mating concave and convex surfaces and opposite flat surfaces, the washers residing with one flat surface abutting the bottom of the caliper mounting foot and the other flat surface abutting the wheel supporting portion of the frame.

6. The brake assembly of claim 3 wherein the mating concave and convex surfaces associated with the mouth of each bore and the bottom of the mounting foot comprise a pair of plates having the mating concave and convex surfaces and opposite flat surfaces, the pair of plates further including the aligned holes, the plates residing with one flat surface abutting the bottom of the mounting foot and the other flat surface abutting the wheel supporting portion of the frame.

7. The assembly of claim 3 wherein the mating concave and convex surfaces associated with the mouth of each bore and the bottom of the mounting foot comprise one of the mating concave and convex surfaces on the bottom of the mounting foot and the other on an elongate plate residing between the bottom of the mounting foot and the frame, the aligned holes extending through the mounting foot and the plate.

8. The assembly of claim 7 wherein the aligned holes are elongate and correspond to the slots in the caliper mounting foot.

9. A structure for attaching a caliper of a disc brake system to a cycle frame with a pair of brake pads advanced by the caliper in operative engagement with a rotor of the disc brake system, the frame having a pair of threaded caliper mounting bores and the caliper having a mounting foot, the attaching structure comprising:

mating concave and convex surfaces between the frame and a bottom of the caliper mounting foot to pivot the caliper about a pivoting axis with a pair of holes corresponding to the caliper mounting bores extending through the concave and convex surfaces;

a pair of spaced slots on the caliper mounting foot extending transverse the pivoting axis and aligned with the holes and the mounting bores; and a pair of bolts axially received in the aligned slots, holes and threaded mounting bores, the bolts engaging the threaded mounting bores to maintain the pads of the caliper in a select orientation relative to the rotor.

10. The attaching structure of claim 9 further comprising:

mating concave and convex surfaces between a head of each bolt and a top of the caliper mounting foot.

11. The attaching structure of claim 10 wherein the mating concave and convex surfaces are on a pair of washers corresponding to each of the bolt heads residing between the bolt heads and the top of the caliper mounting foot.

12. The attaching structure of claim 9 wherein the mating concave and convex surfaces are on a pair of washers corresponding to each of the caliper mounting bores residing between the bottom of the caliper mounting foot and the frame.

13. The attaching structure of claim 9 where in the mating concave and convex surfaces are on a pair of elongate plates residing between the bottom of the caliper mounting foot and the frame.

14. The attaching structure of claim 13 wherein one of the mating concave and convex surfaces is on the bottom of the caliper mounting foot and the other is on an elongate plate residing between the bottom of the caliper mounting foot and the frame.

15. The attaching structure of claim 14 wherein the pair of holes in the elongate plate are elongate to correspond to the slots in the caliper mounting foot.

16. An attachment structure for a caliper of a disc brake assembly comprising the caliper and a rotor, the caliper being attached to a wheel supporting portion of a cycle frame supporting a wheel with the rotor fixedly attached to the wheel and the rotor lying in a fixed plane relative to the supporting portion of the frame, the supporting portion of the frame having a pair of attachment bores oriented to attach the caliper with the rotor received between a pair of brake pads advanced into and out of contact with the rotor by the caliper along a select axis, the attachment structure allowing for infinite variation of the angle of incidence between the select axis and the plane of the rotor within a defined range and the attachment structure securing the caliper to the frame with a select angle of incidence between the select axis and the rotor.

17. An attachment structure for attaching a component to two mounts affixed to a bicycle frame to provide gimbaled movement of the component relative to the frame, the attachment structure comprising:
 a. mating concave and convex surfaces between the mounts and a bottom of the component for enabling hinged movement of the component relative to the mounts about a first axis with a hole extending between each of the mounts and the component through the concave and convex surfaces;
 b. a pair of spaced elongate slots on at least one of the component and the mounts extending transverse the first axis and each slot aligned with one of the holes through the concave and convex surfaces, the spaced slots being positioned relative to one another to enable pivoting of the component relative to the mounts about a second axis perpendicular to the first axis while the slots remain aligned with the holes through the concave and convex surfaces; and
 c. a pair of compression members each having a shaft extending through one of the holes and one of the elongate alignment slots, the compression members selectively compressing the mounts and the component together to fix them relative to one another.

18. The attachment structure of claim 17 wherein the spaced slots are parallel to one another to enable movement of the component relative to the mounts along the length of the slots.

19. The attachment structure of claim 17 wherein the mating concave and convex surfaces are on a pair of washers corresponding to each mount residing between the bottom of the component and each mount.

20. The attachment structure of claim 19 wherein the compression member comprises a bolt including the shaft and having a head spaced from the component, the attachment structure further comprising a pair of washers having mating concave and convex surfaces receiving the shaft of the bolt between the head of the bolt and the component.

* * * * *